United States Patent
Cui et al.

(10) Patent No.: US 11,700,671 B2
(45) Date of Patent: Jul. 11, 2023

(54) CLIENT-SPECIFIC MESH PATHS TO ROOT ACCESS POINTS IN A MESH NETWORK

(71) Applicant: ARRIS Enterprises LLC, Suwanee, GA (US)

(72) Inventors: Zhineng Cui, Sunnyvale, CA (US); Inigo Arockia Nirmal Nevis, Sunnyvale, CA (US); Yun Wu, Sunnyvale, CA (US); Tyan-Shu Jou, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/355,379

(22) Filed: Jun. 23, 2021

(65) Prior Publication Data

US 2021/0410228 A1 Dec. 30, 2021

Related U.S. Application Data

(60) Provisional application No. 63/046,483, filed on Jun. 30, 2020.

(51) Int. Cl.
*H04W 88/00* (2009.01)
*H04W 88/08* (2009.01)
(Continued)

(52) U.S. Cl.
CPC ......... *H04W 88/085* (2013.01); *H04W 40/12* (2013.01); *H04W 74/004* (2013.01); *H04W 84/18* (2013.01); *H04W 88/10* (2013.01)

(58) Field of Classification Search
None
See application file for complete search history.

(56) References Cited

U.S. PATENT DOCUMENTS

2018/0049101 A1* 2/2018 Dacosta ............ H04W 28/065
2018/0206174 A1* 7/2018 Zhou ..................... H04L 5/00
(Continued)

FOREIGN PATENT DOCUMENTS

WO 2019242683 A1 12/2019

OTHER PUBLICATIONS

Extended European Search Report for corresponding European Application No. 21182739.9, 11 pages, dated Nov. 25, 2021.
(Continued)

*Primary Examiner* — Gerald A Smarth
(74) *Attorney, Agent, or Firm* — Steven Stupp; Stewart Wiener

(57) ABSTRACT

During operation, a mesh network access point (MAP) may communicate, via multiple mesh paths in a mesh network with the one or more root access points (RAPs), uplink packets or frames to or from at least two electronic devices. Notably, at a given time, the MAP uses a first mesh path in the mesh paths to communicate a first subset of the uplink packets or frames associated with a first electronic device in the two electronic devices and uses a second (different) mesh path in the mesh paths to communicate a second subset of the uplink packets or frames associated with a second electronic device in the two electronic devices. Moreover, the MAP may dynamically distribute the first electronic device or the second electronic device over the multiple mesh paths, e.g., based at least in part on one or more communication-performance metrics of the mesh paths and/or the mesh network.

20 Claims, 6 Drawing Sheets

(51) Int. Cl.
*H04W 40/12* (2009.01)
*H04W 74/00* (2009.01)
*H04W 84/18* (2009.01)
*H04W 88/10* (2009.01)

(56) References Cited

U.S. PATENT DOCUMENTS

2018/0309636 A1\* 10/2018 Strom .................... H04L 43/08
2019/0150214 A1\* 5/2019 Zhou .................... H04W 76/15
                                                              370/329
2019/0239096 A1    8/2019 Patwardhan et al.
2020/0259758 A1\* 8/2020 Vytla .................... H04L 69/166

OTHER PUBLICATIONS

Jiao et al. "A Service-Oriented Routing Scheme with Load Balancing in Wireless Mesh Networks" 2008 IEEE International Symposium on Wireless Communication Systems, pp. 658-662 (Oct. 21, 2008).

Kim et al. "Multicast Transmission for HEW" LG Electronics, 10 pages (Sep. 16, 2013).

\* cited by examiner

CLIENT-SPECIFIC MESH PATHS TO ROOT ACCESS POINTS IN A MESH NETWORK

CROSS REFERENCE TO RELATED APPLICATIONS

This application claims priority under 35 U.S.C. 119(e) to: U.S. Provisional Application Ser. No. 63/046,483, "Client-Specific Mesh Paths to Root Access Points in a Mesh Network," filed on Jun. 30, 2020, by Herman Cui et al., the contents of which are herein incorporated by reference.

FIELD

The described embodiments relate to techniques for communicating information in a mesh network using client-specific mesh paths or links to root access points in a mesh network.

BACKGROUND

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

One approach to wireless communication is to use a wireless mesh network (which is henceforth referred to as a 'mesh network'). In a mesh network, multiple access points or MAPs (which are sometimes referred to as 'nodes') are organized in a mesh topology in which electronic devices or clients communicate with each other MAPs via zero or more intermediate MAPs or nodes. Because of the time need to update routes, in a mesh network the locations of the MAPs and, thus, the mesh-network topology is typically quasi-static. This allows the mesh paths through the mesh network to converge, so data can be delivered to destinations. Consequently, many mesh networks are a low-mobility centralized form of a wireless ad-hoc network.

In addition to multiple uplink mesh paths through a mesh network, there are often multiple active links or paths to an external network, such as the Internet, via root access points (RAPs) in the mesh network. This configuration allows packets or frames to be forwarded to switches and routers.

However, there are often differences in the communication performance of the RAP and the MAPs. Notably, because of the use of a shared wireless medium in a wireless local area network (WLAN), the MAPs complete or contend with each other for access to the wireless medium. In practice, this results in a client, which is connected to a RAP via one or more MAPs, having poorer communication performance (such as throughput) than a client that is directly connected to the RAP. This degradation in communication performance is increased as the number of intermediate hops in a mesh network increases.

Moreover, when there is a single mesh path in a mesh network via a MAP, this can become a bottleneck or a point-failure mechanism for any of the clients that depend on this mesh path and MAP. Alternatively, if multiple mesh paths are used in a mesh network, loop issues may occur, which can result in dropped packets (and, thus, degraded communication performance) and which can be difficult to debug.

SUMMARY

A MAP that communicates with one or more RAPs via multiple mesh paths in a mesh network is described. This MAP includes: multiple antenna nodes, pads or connectors that can be coupled to multiple antennas; and one or more interface circuits, coupled to the nodes, that wirelessly communicates with at least two electronic devices and the one or more RAPs. Notably, during operation, the MAP may communicate, via the multiple mesh paths to the one or more RAPs, uplink packets or frames from the two electronic devices, where, at a given time, the MAP uses a first mesh path in the multiple mesh paths to communicate a first subset of the uplink packets or frames associated with a first electronic device in the two electronic devices and uses a second (different) mesh path in the multiple mesh paths to communicate a second subset of the uplink packets or frames associated with a second electronic device in the two electronic devices.

In some embodiments, the one or more RAPs provides access to an external network (such as an intranet or the Internet).

Note that the MAP may dynamically distribute the first electronic device, the second electronic device or an additional electronic device over the multiple mesh paths. For example, the MAP may dynamically distribute the first electronic device, the second electronic device and/or the additional electronic device over the multiple mesh paths based at least in part on one or more communication-performance metrics (such as throughputs) of the multiple mesh paths and/or the mesh network.

Moreover, the MAP may communicate the uplink packets or the frames with the one or more RAPs using unicast communication. Alternatively or additionally, the MAP may communicate the uplink packets or the frames with the one or more RAPs using multicast communication.

Furthermore, at least one of the multiple mesh paths may involve a hop via an intermediate MAP in the mesh network.

Additionally, the MAP may use the first mesh path to communicate first downlink packets or frames to the first electronic device, and may use the second mesh path to communicate second downlink packets or frames to the second electronic device. Note that the first downlink packets or frames and the second downlink packets or frames may include unicast downlink packets or frames.

In some embodiments, the MAP uses a third mesh path in the multiple mesh paths to communicate multicast downlink packets or frames to the first electronic device or the second electronic device, where the third mesh path is different from the first mesh path or the second mesh path.

For example, there may be a dedicated and unique downlink mesh path for multicast communication to the first electronic device or the second electronic device. This dedicated and unique downlink mesh path may be different from the first mesh path or the second mesh path used for unicast communication to or from the first electronic device or the second electronic device. Note that if a multicast downlink packet or frame is not addressed to the first electronic device or the second electronic device (or a subnet that includes the first electronic device or the second electronic device), the MAP may drop the multicast downlink packet or frame.

Note that the communication may be compatible with an IEEE 802.11 communication protocol, such as: IEEE 802.11a, IEEE 802.11b, IEEE 802.11g, IEEE 802.11n, IEEE 802.11ac, IEEE 802.11ax, IEEE 802.11be, etc.

Another embodiment provides a computer-readable storage medium for use with the MAP. This computer-readable storage medium may include program instructions that, when executed by the MAP, cause the MAP to perform at least some of the aforementioned operations.

Another embodiment provides a method. This method includes at least some of the operations performed by the MAP.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
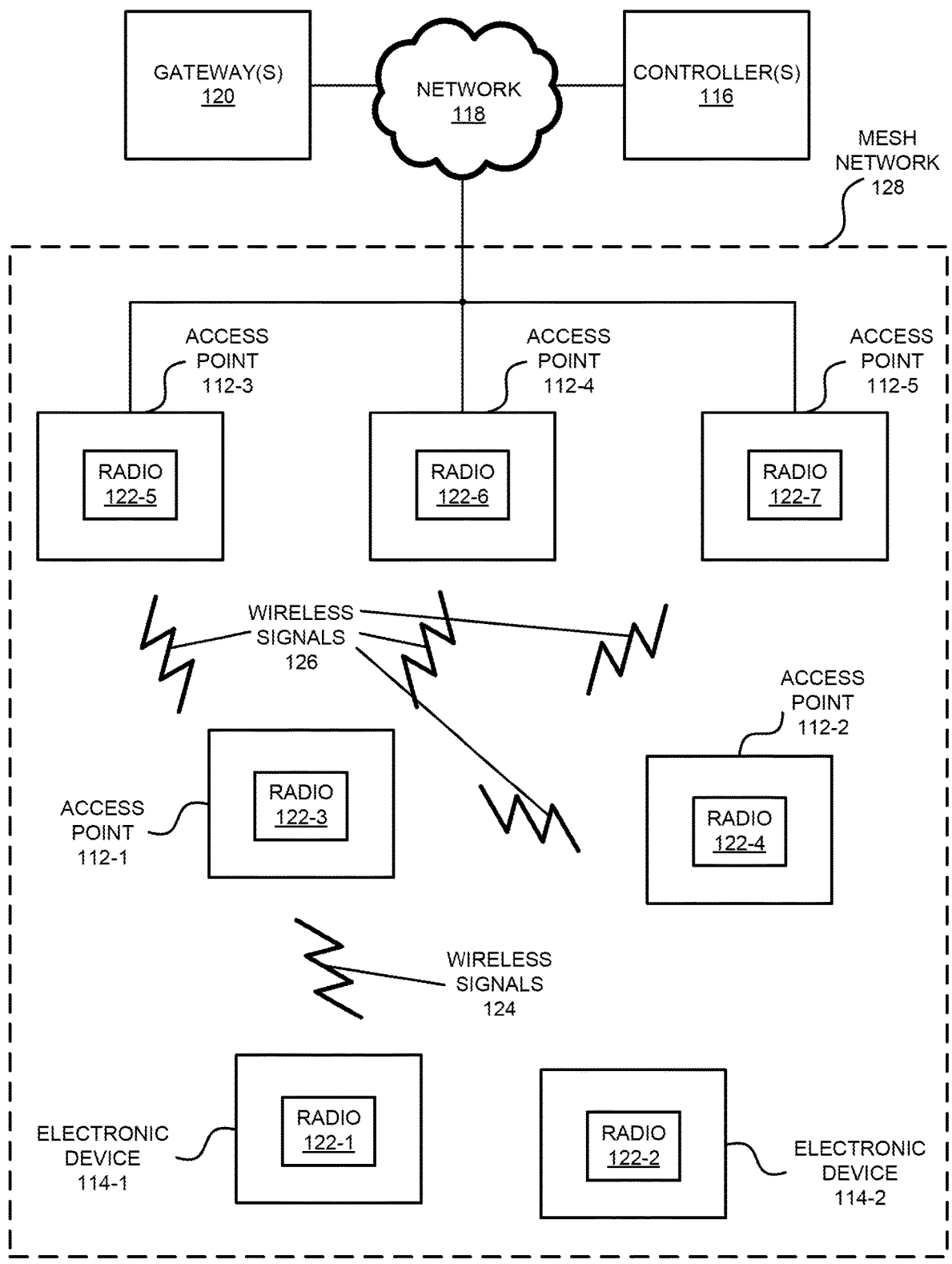
FIG. 1 is a block diagram illustrating an example of a system in accordance with an embodiment of the present disclosure.

A MAP that communicates in a mesh network is described. This MAP may include: multiple antenna nodes that can be coupled to multiple antennas; and one or more interface circuits, coupled to the antenna nodes, that wirelessly communicates with at least two electronic devices and one or more RAPs in the mesh network. Notably, during operation, the MAP may communicate, via multiple mesh paths in the mesh network with the one or more RAPs, uplink packets or frames from the two electronic devices, where, at a given time, the MAP uses a first mesh path in the multiple mesh paths to communicate a first subset of the uplink packets or frames associated with a first electronic device in the two electronic devices and uses a second (different) mesh path in the multiple mesh paths to communicate a second subset of the uplink packets or frames associated with a second electronic device in the two electronic devices. Moreover, the MAP may dynamically distribute the first electronic device or the second electronic device over the multiple mesh paths. For example, the MAP may dynamically distribute the first electronic device or the second electronic device over the multiple mesh paths based at least in part on one or more communication-performance metrics (such as throughputs) of the multiple mesh paths and/or the mesh network.

By using multiple mesh paths through the mesh network to multiple RAPs, these communication techniques provide improved communication performance in the mesh network. Notably, the communication techniques may provide improved communication performance for clients (such as the electronic device) associated with the MAP. In addition, the communication techniques may improve load balancing and/or may prevent loops in the mesh network. Consequently, the communication techniques may improve the user experience when using the electronic device, the MAP and communicating via the mesh network.

In the discussion that follows, electronic devices or components in a system communicate packets in accordance with a wireless communication protocol, such as: a wireless communication protocol that is compatible with an IEEE 802.11 standard (which is sometimes referred to as WiFi®, from the Wi-Fi Alliance of Austin, Tex.), Bluetooth, and/or another type of wireless interface (such as another wireless-local-area-network interface). In some embodiments, the IEEE 802.11 standard or communication protocol may include one or more of: IEEE 802.11a, IEEE 802.11b, IEEE 802.11g, IEEE 802.11n, IEEE 802.11ac, IEEE 802.11ax, IEEE 802.11be or a future IEEE 802.11 standard. Moreover, an access point in the system may communicate with a controller or a service (e.g., via a gateway) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of a system, which may include components, such as: access points 112, one or more electronic devices 114 (such as cellular telephones, stations or clients, another type of electronic device, etc.), and one or more optional controllers 116. In this system, one or more of access points 112 may wirelessly communicate with one or more of the one or more electronic devices 114 using wireless communication that is compatible with an IEEE 802.11 standard. Thus, the wireless communication may occur in, e.g., a 2.4 GHz, a 5 GHz, a 6 GHz and/or a 60 GHz frequency band. (Note that IEEE 802.11ad communication over a 60 GHz frequency band is sometimes referred to as 'WiGig.' In the present discussion, these embodiments are also encompassed by 'Wi-Fi.') However, a wide variety of frequency bands may be used. Moreover, access points 112 may communicate with the one or more optional controllers 116 via network 118 (such as the Internet, an intra-net and/or one or more dedicated links). In addition, access points 112 may communicate with one or more gateways 120 via network 118. Note that the one or more optional controllers 116 and/or the one or more gateways 120 may be at the same location as the other components in the system or may be located remotely (i.e., at a different location). Moreover, note that access points 112 may be managed and/or configured by the one or more optional controllers 116. Furthermore, note that access points 112 may provide access to network 118 (e.g., via an Ethernet protocol), and may be a physical access point or a virtual or 'software' access point that is implemented on a computer or an electronic device.

While not shown in FIG. 1, there may be additional components or electronic devices, such as a router or a switch.

Additionally, access points 112 and the one or more electronic devices 114 may communicate via wireless communication, and at least some of access points 112 may communicate with each other via wireless communication (such as via wireless signals 126). Notably, one or more of access points 112 and one or more of electronic devices 114 may wirelessly communicate while: transmitting advertising frames or packets on wireless channels, detecting one another by scanning wireless channels, exchanging subsequent data/management frames or packets (such as association requests and responses) to establish a connection, configure security options (e.g., Internet Protocol Security), transmit and receive frames or packets via the connection (which may include the association requests and/or additional information as payloads), etc.

Figure 6:
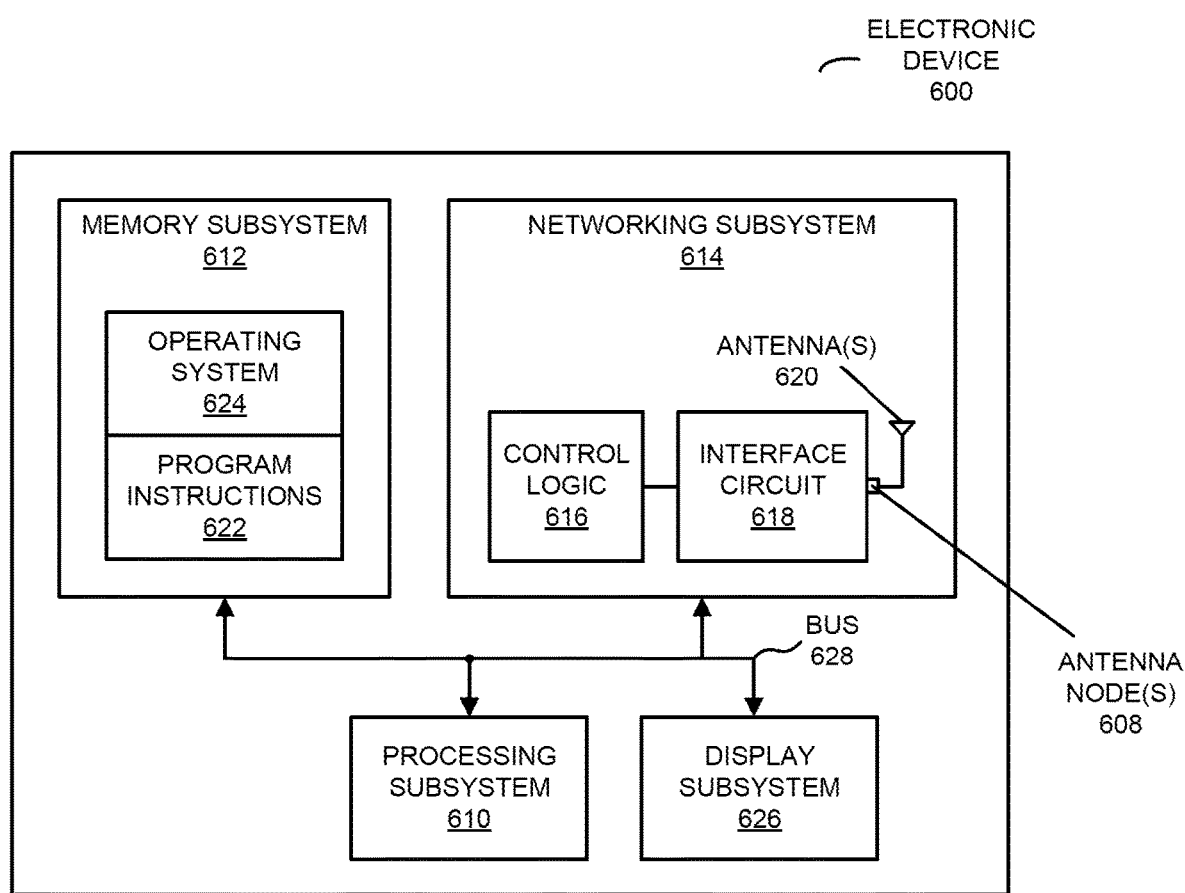
FIG. 6 is a block diagram illustrating an example of an electronic device in accordance with an embodiment of the present disclosure.

As described further below with reference to FIG. 6, access points 112, the one or more electronic devices 114 and/or the one or more optional controllers 116 may include subsystems, such as a networking subsystem, a memory subsystem and a processor subsystem. In addition, access points 112 and the one or more electronic devices 114 may include radios 122 in the networking subsystems. More generally, access points 112 and the one or more electronic devices 114 can include (or can be included within) any electronic devices with the networking subsystems that enable access points 112 and the one or more electronic devices 114 to wirelessly communicate with each other.

As can be seen in FIG. 1, wireless signals 124 (represented by a jagged line) are transmitted from a radio 122-1 in electronic device 114-1. These wireless signals are received by radio 122-3 in at least one of access points 112, such as access point 112-1. Notably, electronic device 114-1 may transmit frames or packets. In turn, these frames or packets may be received by access point 112-1. This may allow electronic device 114-1 to communicate information to access point 112-1. Note that the communication between, e.g., electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In some embodiments, the communication between, e.g., electronic device 114-1 and access point 112-1 may be characterized by an error-rate model, which compares the error rate during communication at the data rate. While instances of radios 122 are shown in the one or more electronic devices 114 and access points 112, one or more of these instances may be different from the other instances of radios 122.

As noted previously, access points 112 may be arranged in a mesh network 128. This mesh network may have a network topology in which access points 112 or nodes relay data in mesh network 128 and access points 112 cooperate in the distribution of data in mesh network 128. Notably, access points 112-1 and 112-2 may be MAPs, and access points 112-3, 112-4 and 112-5 may be RAPs that are coupled to wired network 118. Access points 112-1 and 112-2 may wireless communicate with each other and/or one or more of access points 112-3, 112-4 and 112-5. Moreover, in mesh network 128, a mesh path or link from an electronic device (such as electronic device 114-1) to a RAP (such as access point 112-3) may include at least one wireless connection that communicates information to or from electronic device 114-1 with network 118. For example, the mesh path from electronic device 114-1 and access point 112-1 may include zero or more additional MAPs or intermediary access points (or hops) in mesh network 128, such as access point 112-2. In some embodiments, mesh network 128 includes an access point (which is sometimes called an 'Ethernet mesh electronic device') that communicates with another access point in mesh network 128 using Ethernet.

In FIG. 1, while access points 112-1 and 112-2 have the 'option' to communicate with each other (because they are within communication or wireless range of each other) in a typical IEEE 802.11 network, the network design may involve operating elements that prevent a network loop condition. Thus, while it is ok to 'connect', from the perspective of network packet or frame forwarding, FIG. 1 should not be construed as to imply that a network loop condition exists, if this condition is detrimental to the network. Note that the hierarchy (or tree) of access points 112 in mesh network 128 may dynamically change based on one or more of the communication-performance metrics of the mesh paths or links in mesh network 128, such as based on changes in a radio-frequency environment.

As noted previously, in a mesh network there can be imbalances in the communication performance for electronic devices that are associated with MAPs relative to electronic devices that are directly coupled to a given RAP. In addition, the use of a single mesh path or link in these mesh networks can become bottlenecks.

In order to address these challenges, mesh network 128 may include MAPs (such as access points 112-1 and 112-2) that communicate with one or more RAPs (such as access points 112-3, 112-4 and 112-5) via multiple mesh paths, and the multiple RAPs may provide to an external network (such as network 118, e.g., an intranet or the Internet). For example, each RAP may have a connection or link to the external network. Using access point 112-1 as an example, after establishing the multiple mesh paths (such as establishing connections between, e.g., access point 112-1 and access points 112-3, 112-4 and/or 112-5), access point 112-1 may communicate, via the multiple mesh paths with the one or more RAPs, uplink packets or frames from at least two electronic devices (such as electronic devices 114-1 and 114-2). Note that, at a given time, access point 112-1 may use a first mesh path in the mesh paths to communicate a first subset of the uplink packets or frames associated with electronic device 114-1 and may use a second (different) mesh path in the mesh paths to communicate a second subset of the uplink packets or frames associated with electronic device 114-2. Moreover, access point 112-1 may communicate the uplink packets or the frames with the one or more RAPs using unicast communication and/or multicast communication or broadcast communication. In some embodiments, access point 112-1 may communicate the uplink packets or the frames with the one or more RAPs via an intermediate MAP in mesh network 128, such as access point 112-2.

Furthermore, access point 112-1 may use the first mesh path to communicate first downlink packets or frames to electronic device 114-1, and may use the second mesh path to communicate second downlink packets or frames to electronic device 114-2. Note that the first downlink packets or frames and the second downlink packets or frames may include unicast downlink packets or frames.

Additionally, access point 112-1 may dynamically distribute electronic device 114-1, electronic device 114-2 or an additional electronic device over the multiple mesh paths. For example, the MAP may dynamically distribute electronic device 114-1, electronic device 114-2 and/or the additional electronic device over the multiple mesh paths based at least in part on one or more communication-performance metrics (such as throughputs) of the multiple mesh paths and/or mesh network 128.

In some embodiments, access point 112-1 uses a third mesh path in the multiple mesh paths to communicate multicast downlink packets or frames to electronic device 114-1 and/or electronic device 114-2, where the third mesh path is different from the first mesh path or the second mesh path. For example, there may be a dedicated and unique downlink mesh path for multicast communication to electronic device 114-1 and/or electronic device 114-2. This dedicated and unique downlink mesh path may be different from the first mesh path or the second mesh path used for unicast communication to or from electronic device 114-1 and electronic device 114-2. Note that if a multicast downlink packet or frame is not addressed to electronic device 114-1 or electronic device 114-2 (or a subnet that includes electronic device 114-1 or electronic device 114-2), access point 112-1 may drop the multicast downlink packet or frame. Moreover, in some embodiments, the third mesh path may use a different RAP than the first mesh path or the second mesh path (such as access point 112-3 versus access point 112-4).

In these ways, access points 112 that use the communication techniques may improve communication performance in mesh network 128. Consequently, the communication techniques may improve the user experience when using electronic devices 114, access points 112 and communicating via mesh network 128.

In the described embodiments, processing a frame or a packet in a given one of access points 112 or a given one of the one or more electronic devices 114 may include: receiving wireless signals 124 with the frame or packet; decoding/extracting the frame or packet from the received wireless signals 124 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of access points 112, the one or more electronic devices 114 and/or the one or more optional controllers 116. As another example, in another embodiment, different electronic devices are transmitting and/or receiving frames or packets.

Figure 2:
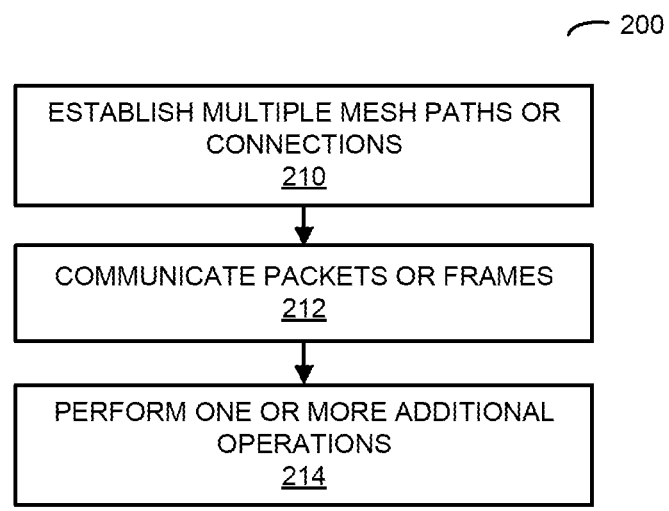
FIG. 2 is a flow diagram illustrating an example method for communicating in a mesh network in the system in FIG. 1 in accordance with an embodiment of the present disclosure.

We now describe embodiments of the method. FIG. 2 presents an example of a flow diagram illustrating an example method 200 for communicating in a mesh network. Moreover, method 200 may be performed by a MAP, such as one of access points 112 in FIG. 1, e.g., access point 112-1.

During operation, the MAP may establish multiple mesh paths or connections (operation 210) in a mesh network with one or more RAPs in the mesh network, where a given RAP provides access to an external network. Then, the MAP may communicate, via the multiple mesh paths with the one or more RAPs, uplink packets or frames (operation 212) from at least two electronic devices, where, at a given time, the MAP uses a first mesh path in the multiple mesh paths to communicate a first subset of the uplink packets or frames associated with a first electronic device in the two electronic devices and uses a second (different) mesh path in the multiple mesh paths to communicate a second subset of the uplink packets or frames associated with a second electronic device in the two electronic devices. Note that the one or more RAPs may provide access to an external network (such as an intranet or the Internet). Moreover, at least one of the multiple mesh paths may involve a hop via an intermediate MAP in the mesh network.

In some embodiments, the MAP may optionally perform one or more additional operations (operation 214). Notably, the MAP may communicate the uplink packets or the frames with the one or more RAPs using unicast communication and/or multicast communication.

Moreover, the MAP may dynamically distribute the first electronic device, the second electronic device or an additional electronic device over the multiple mesh paths. For example, the MAP may dynamically distribute the first electronic device, the second electronic device and/or the additional electronic device over the multiple mesh paths based at least in part on one or more communication-performance metrics (such as throughputs) of the multiple mesh paths and/or the mesh network.

Furthermore, the MAP may use the first mesh path to communicate first downlink packets or frames to the first electronic device, and may use the second mesh path to communicate second downlink packets or frames to the second electronic device. Note that the first downlink packets or frames and the second downlink packets or frames may include unicast downlink packets or frames.

Additionally, the MAP uses a third mesh path in the multiple mesh paths to communicate multicast downlink packets or frames to the first electronic device or the second electronic device, where the third mesh path is different from the first mesh path or the second mesh path. For example, there may be a dedicated and unique downlink mesh path for multicast communication to the first electronic device and/or the second electronic device. This dedicated and unique downlink mesh path may be different from the first mesh path or the second mesh path used for unicast communication to or from the first electronic device or the second electronic device. Note that if a multicast downlink packet or frame is not addressed to the first electronic device or the second electronic device (or a subnet that includes the first electronic device or the second electronic device), the MAP may drop the multicast downlink packet or frame.

In some embodiments of method 200, there may be additional or fewer operations. Moreover, there may be different operations. Furthermore, the order of the operations may be changed, and/or two or more operations may be combined into a single operation.

Figure 3:
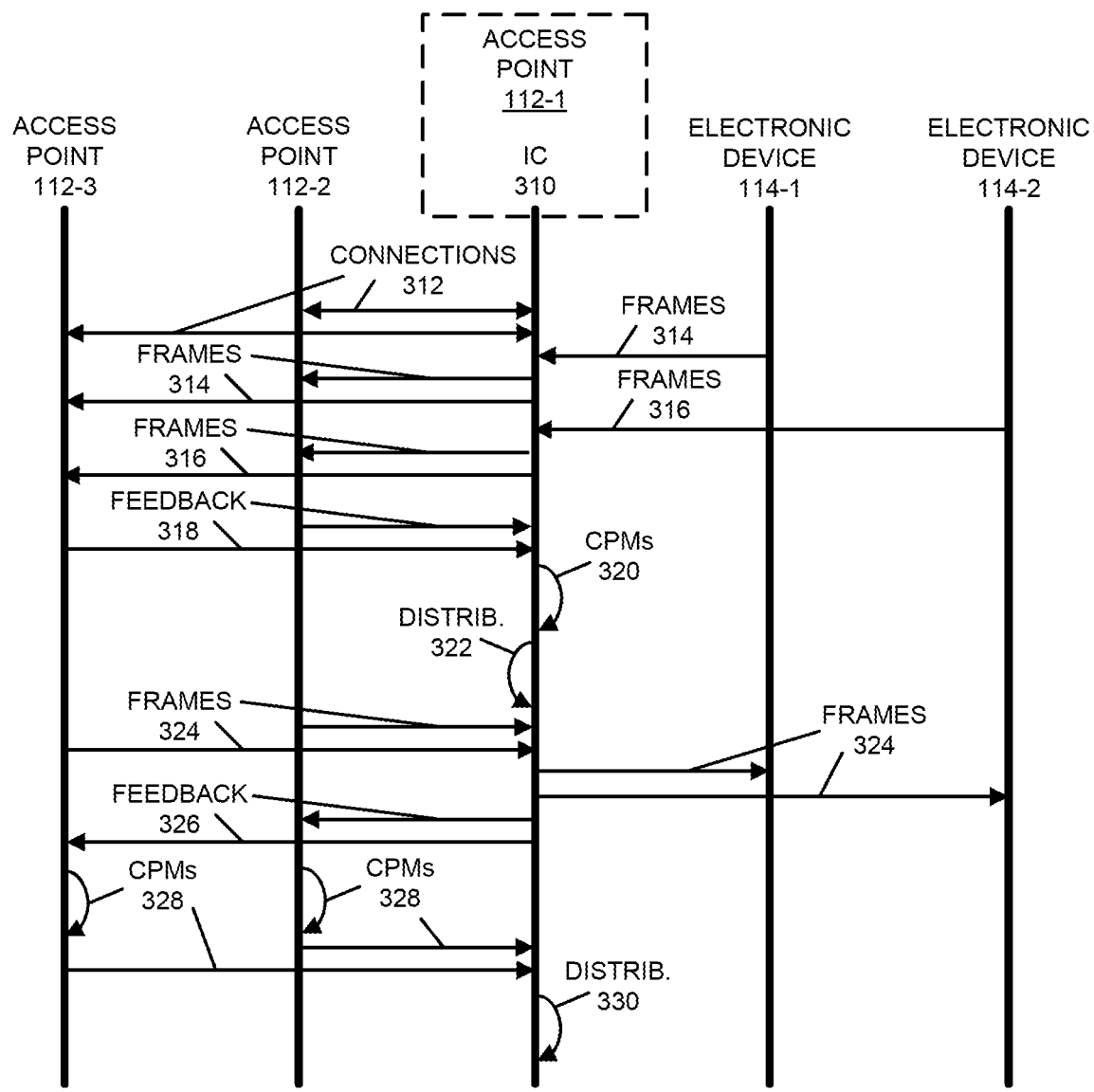
FIG. 3 is a drawing illustrating an example of communication among electronic devices in FIG. 1 in accordance with an embodiment of the present disclosure.

FIG. 3 presents a drawing illustrating an example of communication between electronic device 114-1, access point 112-1, access point 112-3 and access point 112-4. In FIG. 3, interface circuit (IC) 310 in access point 112-1 (which may be a MAP in mesh network 128) may establish multiple mesh paths or connections 312 with multiple RAPs in a mesh network, such as access point 112-3 and access point 112-4. Note that access point 112-3 and access point 112-4 may each provide access to an external network.

Then, electronic devices 114-1 and 114-2 may provide uplink packets or frames 314-1 and 316 to access point 112-1. These frames may have a destination address that is accessed via the external network. After receiving frames 314 and 316, interface circuit 310 may provide frames 314 and 316 to access point 112-3 and/or access point 112-4 via mesh paths in the multiple mesh paths that are, respectively, associated with electronic device 114-1 or electronic device 114-1. Note that the uplink mesh path associated with electronic device 114-1 may be different from the uplink mesh path associated with electronic device 114-2. Next, access point 112-3 and/or access point 112-4 may provide frames to the external network.

Alternatively, access point 112-3 and access point 112-4 may receive packets or frames 324 from the external network. These frames may be addressed to electronic device 114-1 or electronic device 114-2. In response, access point 112-3 and access point 112-4 may provide frames 324 to access point 112-1 via the mesh path for electronic device 114-1 or electronic device 114-2 (depending on the destination of frames 324). After receiving frames 324, interface circuit 310 may provide frames 324 to electronic device 114-1 or electronic device 114-2.

In some embodiments, access point 112-1 may dynamically distribute electronic devices 114 over the multiple mesh paths. For example, interface circuit 310 may receive feedback 318 (such as acknowledgments) from access point 112-3 and/or access point 112-4 about the communication of frames 314 and/or 316 via the multiple mesh paths. In response, interface circuit 310 may determine one or more communication-performance metrics (CPMs) 320 associated with the multiple mesh paths. Then, interface circuit 310 may dynamically distribute 322 electronic device 114-1, electronic device 114-2 and/or an additional electronic device over the multiple mesh paths based at least in part on communication-performance metrics 320.

Alternatively, interface circuit 310 may provide feedback 326 such as acknowledgments) to access point 112-3 and/or access point 112-4 about the communication of frames 324 via a given one of the multiple mesh paths. Using this feedback, access point 112-3 and/or access point 112-4 may determine one or more communication-performance metrics (CPMs) 328 associated with one or more of the multiple mesh paths. Then, access point 112-3 and/or access point 112-4 may provide information specifying the one or more communication-performance metrics 328 to access point 112-1 via one or more of the multiple mesh paths, and access point 112-1 may dynamically distribute 330 electronic device 114-1, electronic device 114-2 and/or the additional electronic device over the multiple mesh paths based at least in part on communication-performance metrics 328.

While FIG. 3 illustrates some operations using unilateral or bilateral communication (which are, respectively, represented by one-sided and two-sided arrows), in general a given operation in FIG. 3 may involve unilateral or bilateral communication.

In some embodiments, one or more of the MAPs in a mesh network may implement the communication techniques to provide dynamic wireless client distribution. Notably, a MAP (such as access point 112-1 in FIG. 1) may setup or establish multiple mesh paths or links (e.g., via one or more radios), and may distribute traffic associated with a given wireless client to a corresponding mesh path to one or more RAPs in the mesh network, which may provide unique paths to one or more gateways.

Notably, assume there are some RAPs and MAPs in a mesh network. A candidate MAP that is joining the mesh network may scan (such as periodically or as-needed) RAPs and MAPs in its wireless environment and may update a list of neighboring access point. Moreover, the candidate MAP may choose the best uplink RAP/MAP with which to connect or to establish a connection.

Once connected to the wireless mesh network, this MAP may provide wireless network services to wireless clients by announcing or broadcasting its service set identifier(s) (SSIDs). Moreover, the MAP may receive (e.g., from a controller and/or from one or more of the MAPs and/or RAPs in the mesh network) a load condition of the wireless mesh network via its uplink access point (such as another MAP or the RAP) or a controller.

Furthermore, if the load of wireless clients of the MAP reaches a threshold (such as 2, 5 or 10 clients), the MAP may setup (e.g., via the same or a different radio) one or more additional mesh paths or links to the same uplink access point or a different mesh path or link to another RAP (e.g., based at least in part on the load condition of the wireless mesh network, such as 50% of a maximum number of client supported by the MAP or a configurable load condition or threshold).

Then, the MAP may dynamically distribute the wireless clients to the mesh paths. This dynamically distribution may be based at least in part on one or more of: a number of wireless clients on each of the multiple mesh paths from the MAP to the RAPs; the radio interference of each mesh path from the MAP to a given RAP (e.g., the RSSI); and/or the current traffic load of each mesh path from the MAP to the given RAP. For example, if the uplink RSSI is less than 20 dBm (or a configurable value or threshold), then the MAP may determine to establish another uplink and start forwarding the client traffic to the other uplink.

Thus, in some embodiments, a given mesh path or link may support or may be associated with one or more clients, and different subsets of clients may be supported or associated with different subsets of clients. However, in order to avoid a loop in the mesh network, at a given time, in some embodiments a wireless client may only be assigned to a unique uplink mesh path. This is because, if there is only one route or mesh path to the external network, no loops should occur.

Note that the dynamic distribution of the MAP may be provided to a controller, which may publish this information to the mesh network. Alternatively, the MAP may provide its dynamic distribution to the MAPs and/or RAPs to which it is connected. Based at least in part on this information, the MAPs in the mesh network may update their wireless client load conditions.

Figure 4:
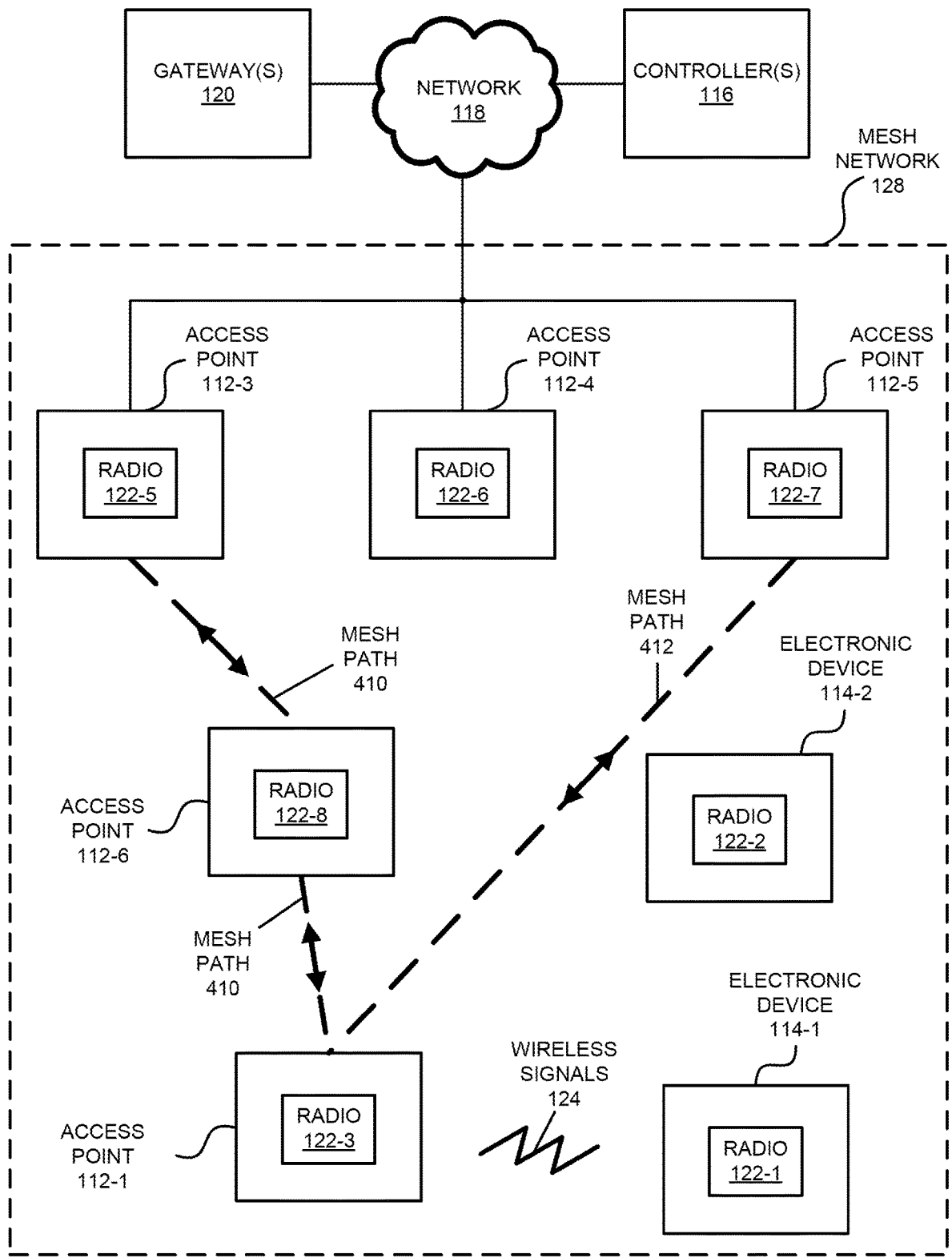
FIG. 4 is a drawing illustrating an example of communication in a mesh network in the system in FIG. 1 in accordance with an embodiment of the present disclosure.

FIG. 4 presents a drawing illustrating an example of communication in mesh network 128. Notably, access point 112-1 may have: mesh path 410 or link with access point 112-3 via access point 112-6; mesh path 412 or link with access point 112-5. Note that mesh path 410 may be used for uplink or downlink unicast communication and/or uplink multicast communication associated with electronic device 114-1, while mesh path 412 may be used for uplink or downlink unicast communication and/or uplink multicast communication associated with electronic device 114-2.

In some embodiments, when packets or frames from upstream network devices in the mesh network are received, the MAP may try to forward them to its wireless clients. However, if there are multiple mesh paths or links, the received packets or frames may include a duplicate of another packet or frame that was received via another mesh-path interface and which may have already been forwarded to the appropriate wireless client.

For example, this may occur when a packet or a frame is a unicast packet or frame, because a wireless client may only be assigned to one unique mesh path or link at a given moment (in order to prevent a loop from occurring). Note that when switching between mesh paths or links, a previous or an old mesh path or link may still receive a unicast packet or frame directed toward a transiting wireless client. In this case, the MAP may send out a layer-2 (L2) broadcast frame (e.g., a L2 uplink frame) to update the mesh network regarding the port switch.

Alternatively, a duplicate may occur when a packet or frame is a multicast packet or frame (e.g., the upstream network device may be flooding the mesh network). In order to ensure that the MAP does not forward a duplicate packet or frame to its wireless client, the MAP may only assign one mesh path for inbound downlink multicast packets or frames. Thus, the MAP may only accept and forward packets or frames from a common downlink multicast mesh path (which is sometimes referred to as a 'common mesh link' or CML).

For an outbound multicast packet or frame, the MAP may send it out from a current designated mesh link for a wireless client. Notably, the outbound multicast packet may be communicated the same way as unicast uplink or downlink packets or frames. For example, the outbound multicast packets may be multicast to all the multiple mesh paths to the RAPs in the mesh network. Note that when the MAP receives a multicast packet from its CML, it may drop it in order to avoid loop back. These approaches may prevent the occurrence of loops for both uplink and downlink multicast packets or frames.

Figure 5:
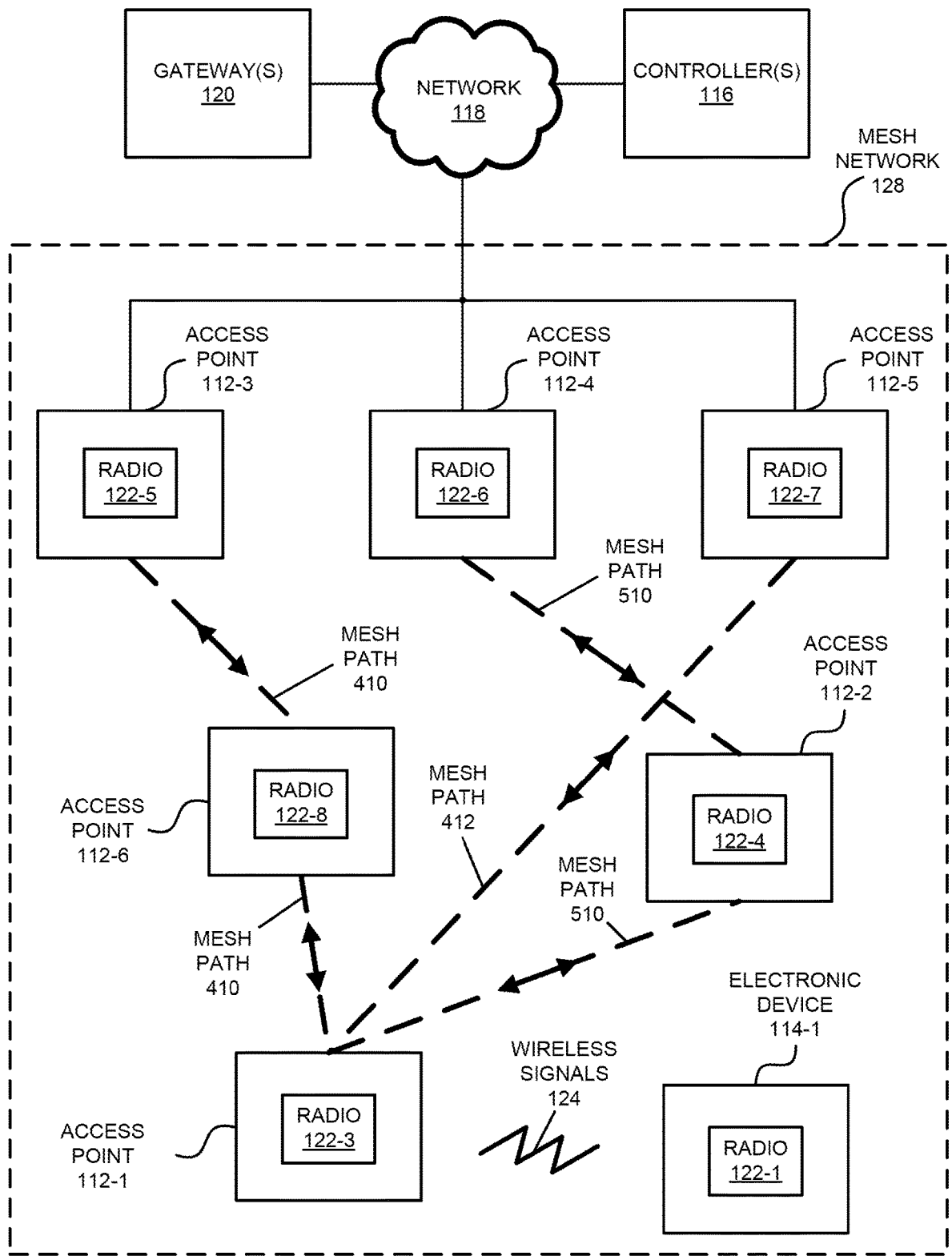
FIG. 5 is a drawing illustrating an example of communication in a mesh network in the system in FIG. 1 in accordance with an embodiment of the present disclosure.

FIG. 5 presents a drawing illustrating an example of communication in mesh network 128. Notably, there may be a mesh paths 410 and 412 between access point 112-1 (which is a MAP) and access points 112-3 and 112-5, respectively. In addition, mesh path 510 between access point 112-4 and access point 112-1 may be the CML. This CIVIL may be used for downlink multicast packets or frames. This designated downlink mesh path may be used for multicast packets or frames addressed to one or more electronic devices, such as electronic device 114-1.

In some embodiments, clients are distributed to mesh paths in a mesh network using one or more load distribution techniques, such as using a round-robin load distribution technique, based at least in part on a remaining throughput of a given mesh path, radio utilization, etc. The one or more load distribution techniques may be centrally implemented via one or more controllers and/or using a distributed technique, such as by a given access point.

We now describe embodiments of an electronic device, which may perform at least some of the operations in the communication techniques. For example, the electronic device may include a component in the system in FIG. 1, such as one of: access points 112, one or more electronic devices 114 and/or the one or more optional controllers 116. FIG. 6 presents a block diagram illustrating an electronic device 600 in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, graphical processor units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory (which collectively or individually are sometimes referred to as a 'computer-readable storage medium'). In some embodiments, instructions for processing subsystem 610 in memory subsystem 612 include: one or more program modules or sets of instructions (such as program instructions 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing sub system 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more antenna nodes, connectors or pads, such as nodes 608, e.g., an antenna node, a connector or a pad, which can be coupled to the one or more antennas 620. Thus, electronic device 600 may or may not include the one or more antennas 620.) For example, networking subsystem 614 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 600 may be adapted or changed using pattern shapers (such as reflectors) in one or more antennas 620 (or antenna elements), which can be independently and selectively electrically coupled to ground to steer the transmit antenna radiation pattern in different directions. Thus, if one or more antennas 620 includes N antenna-radiation-pattern shapers, the one or more antennas 620 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting frames and/or scanning for frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment (such as an Evolved Node B or eNodeB and, more generally, a base station in a cellular-telephone network), a wireless dongle, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE (and, more generally, a band of frequencies used to communicate data, e.g., in a cellular-telephone network, such as a microcell, a small cell, etc.). In some embodiments, the communication between electronic devices uses multi-user transmission, such as orthogonal frequency division multiple access or OFDMA.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A mesh access point (MAP), comprising:
   multiple antenna nodes configured to couple to multiple antennas; and
   one or more interface circuits, coupled to the antenna nodes, configured to wireless communicate with at least two electronic devices and one or more root access points (RAPs) in the mesh network, wherein the MAP is configured to:
   communicate, via multiple mesh paths in the mesh network and addressed to the one or more RAPs, uplink packets or frames associated with the two electronic devices, wherein, at a given time, the MAP is configured to use a first mesh path in the multiple mesh paths to communicate a first subset of the uplink packets or frames associated with a first electronic device in the two electronic devices and is configured to use a second mesh path in the multiple mesh paths to communicate a second subset of the uplink packets or frames associated with a second electronic device in the two electronic devices;
   wherein the first subset of the uplink packets or frames comprise one or more first packets or frames in the uplink packets or frames and the second subset of the uplink packets or frames comprise one or more second packets or frames in the uplink packets or frames; and
   wherein the first mesh path is different from the second mesh path;
   establishing a third mesh path in the multiple mesh paths, for multicast downlink packets or frames, wherein the third mesh path is different from the first mesh path or the second mesh path;
   receiving, via the third mesh path, a multicast uplink packet or frame; and
   dropping the multicast uplink packet or frame.

2. The MAP of claim 1, wherein the one or more RAPs provide access to an external network.

3. The MAP of claim 1, wherein the MAP is configured to dynamically distribute traffic associated with the first electronic device, the second electronic device or an additional electronic device over the multiple mesh paths based at least in part on one or more communication-performance metrics of the multiple mesh paths, the mesh network or both.

4. The MAP of claim 1, wherein the MAP is configured to communicate the uplink packets or the frames addressed to the one or more RAPs using unicast communication or multicast communication.

5. The MAP of claim 1, wherein at least one of the multiple mesh paths comprises a hop via an intermediate MAP in the mesh network.

6. The MAP of claim 1, wherein the MAP is configured to use the first mesh path to communicate first downlink packets or frames addressed to the first electronic device, and is configured to use the second mesh path to communicate second downlink packets or frames addressed to the second electronic device.

7. The MAP of claim 6, wherein the first downlink packets or frames and the second downlink packets or frames comprise unicast downlink packets or frames.

8. The MAP of claim 1, wherein the third mesh path is a dedicated and unique downlink mesh path for multicast communication to the first electronic device or the second electronic device.

9. The MAP of claim 1, wherein the communication is compatible with an Institute of Electrical and Electronics Engineers (IEEE) 802.11 communication protocol.

10. A non-transitory computer-readable storage medium for use in conjunction with a mesh access point (MAP), the computer-readable storage medium storing program instructions, wherein, when executed by the MAP, the program instructions cause the MAP to perform operations comprising:
   establishing multiple mesh paths in a mesh network with one or more root access points (RAPs) in the mesh network, wherein the one or more RAPs provide access to an external network;
   communicating, via the multiple mesh paths and addressed to the one or more RAPs, uplink packets or frames associated with at least two electronic devices, wherein, at a given time, the MAP uses a first mesh path in the multiple mesh paths to communicate a first subset of the uplink packets or frames associated with a first electronic device in the two electronic devices and uses a second mesh path in the multiple mesh paths to communicate a second subset of the uplink packets or frames associated with a second electronic device in the two electronic devices;

wherein the first subset of the uplink packets or frames comprise one or more first packets or frames in the uplink packets or frames and the second subset of the uplink packets or frames comprise one or more second packets or frames in the uplink packets or frames; and wherein the first mesh path is different from the second mesh path;

establishing a third mesh path in the multiple mesh paths, for multicast downlink packets or frames, wherein the third mesh path is different from the first mesh path or the second mesh path;

receiving, via the third mesh path, a multicast uplink packet or frame; and dropping the multicast uplink packet or frame.

11. The non-transitory computer-readable storage medium of claim 10, wherein the operations comprise dynamically distributing traffic associated with the first electronic device, the second electronic device or an additional electronic device over the multiple mesh paths based at least in part on one or more communication-performance metrics of the multiple mesh paths, the mesh network or both.

12. The non-transitory computer-readable storage medium of claim 10, wherein the MAP communicates the uplink packets or the frames addressed to the one or more RAPs using unicast communication or multicast communication.

13. The non-transitory computer-readable storage medium of claim 10, wherein at least one of the multiple mesh paths comprises a hop via an intermediate MAP in the mesh network.

14. The non-transitory computer-readable storage medium of claim 10, wherein the operations comprise using the first mesh path to communicate first downlink packets or frames addressed to the first electronic device, and using the second mesh path to communicate second downlink packets or frames addressed to the second electronic device.

15. The non-transitory computer-readable storage medium of claim 14, wherein the first downlink packets or frames and the second downlink packets or frames comprise unicast downlink packets or frames.

16. The non-transitory computer-readable storage medium of claim 10, wherein the third mesh path is a dedicated and unique downlink mesh path for multicast communication to the first electronic device or the second electronic device.

17. A method for communicating in a mesh network, comprising:
by a mesh access point (MAP):
establishing multiple mesh paths in the mesh network with one or more root access points (RAPs) in the mesh network, wherein the one or more RAPs provide access to an external network;

communicating, via the multiple mesh paths and addressed to the one or more RAPs, uplink packets or frames associated with at least two electronic devices, wherein, at a given time, the MAP uses a first mesh path in the multiple mesh paths to communicate a first subset of the uplink packets or frames associated with a first electronic device in the two electronic devices and uses a second mesh path in the multiple mesh paths to communicate a second subset of the uplink packets or frames associated with a second electronic device in the two electronic devices;

wherein the first subset of the uplink packets or frames comprise one or more first packets or frames in the uplink packets or frames and the second subset of the uplink packets or frames comprise one or more second packets or frames in the uplink packets or frames; and wherein the first mesh path is different from the second mesh path;

establishing a third mesh path in the multiple mesh paths, for multicast downlink packets or frames, wherein the third mesh path is different from the first mesh path or the second mesh path;

receiving, via the third mesh path, a multicast uplink packet or frame; and dropping the multicast uplink packet or frame.

18. The method of claim 17, wherein the third mesh path is a dedicated and unique downlink mesh path for multicast communication to the first electronic device or the second electronic device.

19. The method of claim 17, wherein the method comprises dynamically distributing traffic associated with the first electronic device, the second electronic device or an additional electronic device over the multiple mesh paths based at least in part on one or more communication-performance metrics of the multiple mesh paths, the mesh network or both.

20. The method of claim 17, wherein at least one of the multiple mesh paths comprises a hop via an intermediate MAP in the mesh network.

* * * * *